US006178199B1

(12) United States Patent
Miller

(10) Patent No.: US 6,178,199 B1
(45) Date of Patent: Jan. 23, 2001

(54) DCE CONTROLLED V.8 BIS NEGOTIATION

(75) Inventor: Robert J. Miller, Raleigh, NC (US)

(73) Assignee: Cirrus Logic, Inc., Austin, TX (US)

( * ) Notice: Under 35 U.S.C. 154(b), the term of this patent shall be extended for 0 days.

(21) Appl. No.: 08/877,583

(22) Filed: Jun. 17, 1997

(51) Int. Cl.[7] .................................................. H04B 1/38
(52) U.S. Cl. .......................................................... 375/222
(58) Field of Search .................................. 375/222, 220, 375/257; 395/200.3, 200.43, 200.42, 200.47, 200.5, 200.51, 200.52, 200.78; 379/93.01, 93.31

(56) References Cited

U.S. PATENT DOCUMENTS

| | | | | |
|---|---|---|---|---|
| 4,953,210 | * | 8/1990 | McGlynn et al. | 380/48 |
| 5,153,897 | * | 10/1992 | Sumiyoshi et al. | 375/222 |
| 5,359,709 | * | 10/1994 | Blanc et al. | 375/222 |
| 5,483,556 | * | 1/1996 | Pillan et al. | 375/340 |
| 5,493,609 | * | 2/1996 | Winseck et al. | 379/96 |
| 5,729,573 | * | 3/1998 | Bailey et al. | 375/222 |
| 5,764,639 | * | 6/1998 | Staples et al. | 370/401 |
| 5,784,633 | * | 7/1998 | Petty | 395/200.43 |
| 5,787,116 | * | 7/1998 | Lam et al. | 375/222 |
| 5,797,042 | * | 8/1998 | Gaylord | 395/876 |
| 5,847,752 | * | 12/1998 | Sebestyen | 348/17 |
| 5,878,120 | * | 3/1999 | O'Mahony | 379/93.09 |

OTHER PUBLICATIONS

"XIRCOM Technical Bulletin Technology Background", Jan. 7, 1997, pp. 1–4, XP–002084811, www.xircom.con./tech/helpdocs/4049.html.

V. Bruté De Rémur et al., "Sematrans 256: how to transmit at 32 kbit/s on the telephone network", Commutation et Transmission, vol. 17, No. 1, Jan. 1995, pp. 27–34.

* cited by examiner

Primary Examiner—Chi H. Pham
Assistant Examiner—Emmanuel Bayard
(74) Attorney, Agent, or Firm—J. P. Violette; Peter Rutkowski; David L. Stewart

(57) ABSTRACT

An extended V.8bis command sequence enables a DTE to configure a DCE for alternative configurations and for independent V.8bis protocol negotiations. The DCE can be configured by sending it an AT command sequence as part of an initialization string. In this way, legacy applications can use the full capabilities of modems without rewriting the legacy application code.

22 Claims, 15 Drawing Sheets

| Message Type Field | Revision Number Field | Bit-Encoded Parameter Field |
|---|---|---|

Figure 6

| Message Type | Bit Numbers | | | |
|---|---|---|---|---|
| | 4 | 3 | 2 | 1 |
| MS | 0 | 0 | 0 | 1 |
| CL | 0 | 0 | 1 | 0 |
| CLR | 0 | 0 | 1 | 1 |
| ACK(1) | 0 | 1 | 0 | 0 |
| ACK(2) | 0 | 1 | 0 | 1 |
| NAK(1) | 1 | 0 | 0 | 0 |
| NAK(2) | 1 | 0 | 0 | 1 |
| NAK(3) | 1 | 0 | 1 | 0 |
| NAK(4) | 1 | 0 | 1 | 1 |

Figure 7

| Revision Number | Bit Numbers | | | |
|---|---|---|---|---|
| | 8 | 7 | 6 | 5 |
| Revision 1 | 0 | 0 | 0 | 1 |

Figure 8

| NPar(1)s | 8 | 7 | 6 | 5 | 4 | 3 | 2 | 1 |
|---|---|---|---|---|---|---|---|---|
| V.8 (see §9.9) | x | x | x | x | x | x | x | 1 |
| Short V.8 (see §9.9) | x | x | x | x | x | x | 1 | x |
| Additional Information Available (see §9.10) | x | x | x | x | x | 1 | x | x |
| Transmit ACK(1) (see §9.7.) | x | x | x | x | 1 | x | x | x |
| Reserved for allocation by the ITU-T | x | x | x | 1 | x | x | x | x |
| Reserved for allocation by the ITU-T | x | x | 1 | x | x | x | x | x |
| Non Standard Field | x | 1 | x | x | x | x | x | x |
| No parameters set in this octet | x | 0 | 0 | 0 | 0 | 0 | 0 | 0 |

Figure 9A

| SPar(1)s | 8 | 7 | 6 | 5 | 4 | 3 | 2 | 1 |
|---|---|---|---|---|---|---|---|---|
| Network Type (see Note 2) | x | x | x | x | x | x | x | 1 |
| Reserved for allocation by the ITU-T | x | x | x | x | x | x | 1 | x |
| Reserved for allocation by the ITU-T | x | x | x | x | x | 1 | x | x |
| Reserved for allocation by the ITU-T | x | x | x | x | 1 | x | x | x |
| Reserved for allocation by the ITU-T | x | x | x | 1 | x | x | x | x |
| Reserved for allocation by the ITU-T | x | x | 1 | x | x | x | x | x |
| Reserved for allocation by the ITU-T | x | 1 | x | x | x | x | x | x |
| No Parameters set in this octet | x | 0 | 0 | 0 | 0 | 0 | 0 | 0 |

Figure 9B

| Network Type NPar(2)s | 8 | 7 | 6 | 5 | 4 | 3 | 2 | 1 |
|---|---|---|---|---|---|---|---|---|
| Cellular Access | x | x | x | x | x | x | x | x |
| ISDN Access (see Note 3) | x | x | x | x | x | x | 1 | x |
| Reserved for allocation by the ITU-T | x | x | x | x | x | 1 | x | x |
| Reserved for allocation by the ITU-T | x | x | x | x | 1 | x | x | x |
| Reserved for allocation by the ITU-T | x | x | x | 1 | x | x | x | x |
| Non Standard Network (See Note 3) | x | x | 1 | x | x | x | x | x |
| No parameters set in this octet | x | x | 0 | 0 | 0 | 0 | 0 | 0 |

Figure 9C

| NPar(1)s | 8 | 7 | 6 | 5 | 4 | 3 | 2 | 1 |
|---|---|---|---|---|---|---|---|---|
| Reserved for allocation by the ITU-T | x | x | x | x | x | x | x | 1 |
| Reserved for allocation by the ITU-T | x | x | x | x | x | x | 1 | x |
| Reserved for allocation by the ITU-T | x | x | x | x | x | 1 | x | x |
| Reserved for allocation by the ITU-T | x | x | x | x | 1 | x | x | x |
| Reserved for allocation by the ITU-T | x | x | x | 1 | x | x | x | x |
| Reserved for allocation by the ITU-T | x | x | 1 | x | x | x | x | x |
| Non Standard Capabilities | x | 1 | x | x | x | x | x | x |
| No parameters in this octet | x | 0 | 0 | 0 | 0 | 0 | 0 | 0 |

Figure 10A

| SPar(1)s | 8 | 7 | 6 | 5 | 4 | 3 | 2 | 1 |
|---|---|---|---|---|---|---|---|---|
| Data | x | x | x | x | x | x | x | 1 |
| Simultaneous Voice & Data | x | x | x | x | x | x | 1 | x |
| H.324 Multimedia terminal | x | x | x | x | x | 1 | x | x |
| V.18 Text Telephone | x | x | x | x | 1 | x | x | x |
| Reserved for use by ITU-T/SG 8 (see Note 4) | x | x | x | 1 | x | x | x | x |
| Analogue telephony | x | x | 1 | x | x | x | x | x |
| T.101 Videotex Terminal | x | 1 | x | x | x | x | x | x |
| No parameters in this octet | x | 0 | 0 | 0 | 0 | 0 | 0 | 0 |

Figure 10B

| Data NPar(2)s | 8 | 7 | 6 | 5 | 4 | 3 | 2 | 1 |
|---|---|---|---|---|---|---|---|---|
| Transparent Data | x | x | x | x | x | x | x | 1 |
| V.42 error control (See Note 8) | x | x | x | x | x | x | 1 | x |
| V.42 bis data compression (See Note 8) | x | x | x | x | x | 1 | x | x |
| V14 async/sync conversion | x | x | x | x | 1 | x | x | x |
| T.120 Conferencing | x | x | x | 1 | x | x | x | x |
| Non Standard Capabilities | x | x | 1 | x | x | x | x | x |
| No parameters in this octet | x | x | 0 | 0 | 0 | 0 | 0 | 0 |

Figure 11A

| | 16 | 15 | 14 | 13 | 12 | 11 | 10 | 9 |
|---|---|---|---|---|---|---|---|---|
| Data NPar(2)s | 8 | 7 | 6 | 5 | 4 | 3 | 2 | 1 |
| T.84 SPIFF (see Notes 5, 6 and 7) | x | x | x | x | x | x | x | 1 |
| T.434 File Transfer (See Note 6) | x | x | x | x | x | x | 1 | x |
| V.ib Synchronous Data HDLC | x | x | x | x | x | 1 | x | x |
| Reserved for allocation by the ITU-T | x | x | x | x | 1 | x | x | x |
| V.34 (Duplex Mode) | x | x | x | 1 | x | x | x | x |
| V.32 bis | x | x | 1 | x | x | x | x | x |
| No parameters in this octet | x | x | 0 | 0 | 0 | 0 | 0 | 0 |

Figure 11B

| | 24 | 23 | 22 | 21 | 20 | 19 | 18 | 17 |
|---|---|---|---|---|---|---|---|---|
| Data NPar(2)s | 8 | 7 | 6 | 5 | 4 | 3 | 2 | 1 |
| V.32 | x | x | x | x | x | x | x | 1 |
| V.22 bis | x | x | x | x | x | x | 1 | x |
| V.22 | x | x | x | x | x | 1 | x | x |
| V.21 | x | x | x | x | 1 | x | x | x |
| Reserved for allocation by the ITU-T | x | x | x | 1 | x | x | x | x |
| Reserved for allocation by the ITU-T | x | x | 1 | x | x | x | x | x |
| No parameters in this octet | x | x | 0 | 0 | 0 | 0 | 0 | 0 |

Figure 11C

| SVD NPar(2)s | 8 | 7 | 6 | 5 | 4 | 3 | 2 | 1 |
|---|---|---|---|---|---|---|---|---|
| Draft Recommendation V.70 | x | x | x | x | x | x | x | 1 |
| Draft Recommendation V. 61 | x | x | x | x | x | x | 1 | x |
| Reserved for allocation by ITU-T | x | x | x | x | x | 1 | x | x |
| V.34 (Full Duplex Mode) | x | x | x | x | 1 | x | x | x |
| V.32 bis | x | x | x | 1 | x | x | x | x |
| Non Standard Capabilities | x | x | 1 | x | x | x | x | x |
| No Parameters in this octet | x | x | 0 | 0 | 0 | 0 | 0 | 0 |

Figure 12A

| | | | 16 | 15 | 14 | 13 | 12 | 11 | 10 | 9 |
|---|---|---|---|---|---|---|---|---|---|---|
| SVD NPar(2)s | | | 8 | 7 | 6 | 5 | 4 | 3 | 2 | 1 |
| Transparent Data | | | x | x | x | x | x | x | x | 1 |
| V.42 error control (See Note 6) | | | x | x | x | x | x | x | 1 | x |
| V.42 bis data compression (See Note 7) | | | x | x | x | x | x | x | 1 | x | x |
| V14 async/sync conversion | | | x | x | x | x | 1 | x | x | x |
| T.120 Conferencing | | | x | x | x | 1 | x | x | x | x |
| Synchronous HDLC | | | x | x | 1 | x | x | x | x | x |
| No parameters in this octet | | | x | x | 0 | 0 | 0 | 0 | 0 | 0 |

Figure 12B

| SVD NPar(2)s | 8 | 7 | 6 | 5 | 4 | 3 | 2 | 1 |
|---|---|---|---|---|---|---|---|---|
| T.84 SPIFF (See Notes 5,6 & 7) | x | x | x | x | x | x | x | 1 |
| T.434 File Transfer (See Note 6) | x | x | x | x | x | x | 1 | x |
| Reserved for allocation by ITU-T | x | x | x | x | x | 1 | x | x |
| Reserved for allocation by ITU-T | x | x | x | x | 1 | x | x | x |
| Reserved for allocation by ITU-T | x | x | x | 1 | x | x | x | x |
| Reserved for allocation by ITU-T | x | x | 1 | x | x | x | x | x |
| No parameters in this octet | x | x | 0 | 0 | 0 | 0 | 0 | 0 |

Figure 12C

| H.324 NPar(2)s | 8 | 7 | 6 | 5 | 4 | 3 | 2 | 1 |
|---|---|---|---|---|---|---|---|---|
| Video | x | x | x | x | x | x | x | 1 |
| Audio | x | x | x | x | x | x | 1 | x |
| Encyption | x | x | x | x | x | 1 | x | x |
| Reserved for allocation by ITU-T | x | x | x | x | 1 | x | x | x |
| Reserved for allocation by ITU-T | x | x | x | 1 | x | x | x | x |
| Non Standard Capabilities | x | x | 1 | x | x | x | x | x |
| No Parameters in this octet | x | x | 0 | 0 | 0 | 0 | 0 | 0 |

Figure 13A

| H.324 SPar(2)s | 8 | 7 | 6 | 5 | 4 | 3 | 2 | 1 |
|---|---|---|---|---|---|---|---|---|
| Data | x | x | x | x | x | x | x | 1 |
| Reserved for allocation by ITU-T | x | x | x | x | x | x | 1 | x |
| Reserved for allocation by ITU-T | x | x | x | x | x | 1 | x | x |
| Reserved for allocation by ITU-T | x | x | x | x | 1 | x | x | x |
| Reserved for allocation by ITU-T | x | x | x | 1 | x | x | x | x |
| Reserved for allocation by ITU-T | x | x | 1 | x | x | x | x | x |
| No parameters in this octet | x | x | 0 | 0 | 0 | 0 | 0 | 0 |

Figure 13B

| H.324 Data NPar(3)s | 8 | 7 | 6 | 5 | 4 | 3 | 2 | 1 |
|---|---|---|---|---|---|---|---|---|
| V.42 | x | x | x | x | x | x | x | 1 |
| V.14 | x | x | x | x | x | x | 1 | x |
| PPP | x | x | x | x | x | 1 | x | x |
| T.120 | x | x | x | x | 1 | x | x | x |
| T.84 | x | x | x | 1 | x | x | x | x |
| T.434 | x | x | 1 | x | x | x | x | x |
| No parameters in this octet | x | x | 0 | 0 | 0 | 0 | 0 | 0 |

Figure 13C

| V.18 NPar(2)s | 8 | 7 | 6 | 5 | 4 | 3 | 2 | 1 |
|---|---|---|---|---|---|---|---|---|
| Recommendation V.21 | x | x | x | x | x | x | x | 1 |
| Draft Recommendation V.61 | x | x | x | x | x | x | 1 | x |
| Reserved for allocation by ITU-T | x | x | x | x | x | 1 | x | x |
| Reserved for allocation by ITU-T | x | x | x | x | 1 | x | x | x |
| Reserved for allocation by ITU-T | x | x | x | 1 | x | x | x | x |
| Non Standard Capabilities | x | x | 1 | x | x | x | x | x |
| No Parameters in this octet | x | x | 0 | 0 | 0 | 0 | 0 | 0 |

Figure 14

| Analogue Telephony NPar(2)s | 8 | 7 | 6 | 5 | 4 | 3 | 2 | 1 |
|---|---|---|---|---|---|---|---|---|
| Voice | x | x | x | x | x | x | x | 1 |
| Audio Recording Device (See Note 9) | x | x | x | x | x | x | 1 | x |
| Voice Bridging Device (See Note 8) | x | x | x | x | x | 1 | x | x |
| Reserved for allocation by ITU-T | x | x | x | x | 1 | x | x | x |
| Reserved for allocation by ITU-T | x | x | x | 1 | x | x | x | x |
| Non Standard Capabilities | x | x | 1 | x | x | x | x | x |
| No parameters in this octet | x | x | 0 | 0 | 0 | 0 | 0 | 0 |

Figure 15

| T.101 NPar(2)s | 8 | 7 | 6 | 5 | 4 | 3 | 2 | 1 |
|---|---|---|---|---|---|---|---|---|
| Duplex (T.101, F.300 and F.301) | x | x | x | x | x | x | x | 1 |
| V.29 short train (T.104) | x | x | x | x | x | x | 1 | x |
| V.27 ter (T.104) | x | x | x | x | x | 1 | x | x |
| Reserved for allocation by ITU-T | x | x | x | x | 1 | x | x | x |
| Reserved for allocation by ITU-T | x | x | x | 1 | x | x | x | x |
| Non Standard Capabilities | x | x | 1 | x | x | x | x | x |
| No parameters in this octet | x | x | 0 | 0 | 0 | 0 | 0 | 0 |

Figure 16

1. '-' operator for specifying range selections
2. ',' operator for performing AND operations of definitions
3. '+' operator for performing OR operations of definitions
4. '<' operator separates the priority assignment from the remaining field information
5. '>' operator separates the profile from the remaining field information.
6. '.' separates the levels

Figure 17

CMD_ID[a[.b[.c...]]] = "[Pri<][Pro>]Preferred connection1 [+
[Pri<][Pro>]Preferred connection2...]",
"[Pri<][Priority 1 [+[Pri<]Priority2...]"

Figure 18

+A8ID[a[.b[.c...]]] = [rev], "[Pri<][Pro>]Preferred connection1 [+
[Pri<][Pro>]Preferred connection2...]",
"[Pri<][Priority 1 [+[Pri<]Priority2...]"

Figure 19

+A8SI[a.[.b[.c...]]] = "[Pri<][Pro>]Preferred Connection1[+
[Pri<][Pro>]Preferred Connection2...]",
"[Pri<][Priority 1 [+[Pri<]Priority2...]"

Figure 20

DCE CONTROLLED V.8 BIS NEGOTIATION

BACKGROUND OF THE INVENTION

FIELD OF THE INVENTION

The invention relates to communications and, more particularly, to modem-to-modem communications which utilize extensions to the International Telecommunications Union (ITU) Draft Recommendation V.8 bis.

DESCRIPTION OF RELATED ART

Computers and modems are well-known in the art. They are frequently utilized together to provide communications between one terminal or computer equipped with a modem and a different computer similarly equipped.

SUMMARY OF THE INVENTION

The invention relates to methods, apparatus, systems and computer program products for permitting a DTE to configure a DCE and for permitting a DCE to conduct V.8 bis negotiations with other stations. The syntax disclosed is such that DCE V.8 bis extension code does not need to be re-written when additional modem functionality is added.

BRIEF DESCRIPTION OF THE DRAWINGS

FIG. 6 shows the structure of the identification field (I-field) of the information field shown in FIG. 3.

FIG. 7 shows the semantics of the message type field of the I-field shown in FIG. 6.

FIG. 8 shows the structure of the revision number field of the I-field shown in FIG. 6.

FIGS. 9A, 9B and 9C show the semantics of the bit positions of the NPar(1), SPar(1) and NPar(2) portions of the identification field, respectively.

FIGS. 10A and 10B show the semantics of the bit positions of NPar(1) and SPar(1) portions of the standard information field shown in FIG. 3.

FIGS. 11A, 11B and 11C show the semantics of the bits of the first, second and third octets of the data-NPar(2) portions of the standard information field corresponding to bit 1 of the SPar(1) coding shown in FIG. 10B.

FIGS. 12A, 12B and 12C show the semantics of the bits of the first, second and third octets of the simultaneous voice and data NPar(2) portions of the standard information field corresponding to bit 2 of the SPar(1) coding shown in FIG. 10B.

FIGS. 13A, 13B and 13C show the semantics of the bits of the H.324 multimedia terminal NPar(2), SPar(2) and NPar(3) portions of the standard information field corresponding to bit 3 of the SPar(1) coding shown in FIG. 10B.

FIGS. 14, 15 and 16 show the semantics of the bits of the NPar(2) portions of the standard information field corresponding respectively to bits 4 (V.18 text telephone), 6 (analog-telephony) and 7 (T.101 videotex terminal) of SPar(1) coding shown in FIG. 10B.

FIG. 17 illustrates the syntax extensions to V.8 bis in accordance with the invention.

FIG. 18 illustrates the AT command syntax used in accordance with the invention.

FIG. 19 shows the A81D identification field programming syntax used in accordance with the invention.

FIG. 20 shows the A8SI standard information field programming syntax used in accordance with the invention.

DESCRIPTION OF THE PREFERRED EMBODIMENTS

Figure 1:
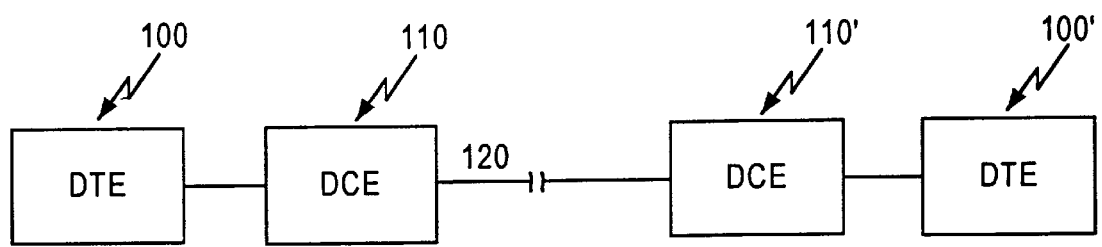
FIG. 1 is a block diagram of a DTE communicating with another DTE over respective DCEs and a connecting telephone line.

FIG. 1 is a block diagram of a DTE communicating with another DTE over respective DCEs and a connecting telephone line.

A number of international standards have been proposed and adopted addressing the type of communications shown in FIG. 1. Various aspects of the invention relate to expanding the functionality of one of those standards, namely V.8 bis, by providing a command syntax which builds upon that provided by V.8 bis to permit a DTE to change a configuration of the DCE to take full advantage of all functionality. The extensions also permit V.8 bis negotiations to occur on a DCE to DCE basis thus obviating the need to rewrite, in large measure, the DTE code. The expanded functionality provided in accordance with the invention permits one to implement preferred capabilities while less preferred capabilities are still available for use. Expanded functionality also permits an ordering of priorities for those capabilities and permits quick and easy changes to the capability list.

The international standardization process is somewhat evolutionary. That is, an initial draft is produced, followed by revisions and subsequent drafts. Frequently, drafts stabilize in important ways prior to final approval so that equipment can be built using the draft standard with some assurance that the fundamental characteristics of the draft will not change in ways which will impact implementation. This is the case with the Mar. 27, 1996 draft of Recommendation V.8 bis entitled Procedures for the Identification and Selection of Common Modes of Operation Between Data Circuit Terminating Equipment (DCE) and Between Data Terminal Equipment (DTE) Over the General Switch Telephone Network and on Leased Point-to-Point Telephone-Type Circuits.

That Mar. 27, 1996 draft is hereby incorporated by reference in its entirety and is attached hereto as Appendix A. The draft in question represents revision 9 of the V.8 bis Recommendation. The ITU determined that since DCEs can communicate according to a number of different V-series recommendations (e.g. V.21, V.32) that a means was needed to determine automatically, prior to initiation of a modem handshake, the modes of operation available within each DCE so that a particular mode of operation between two DCEs may be selected. Similarly, since many DTEs can communicate with other DTEs that it was desirable to be able to determine the different modes of operation available within each DTE so that a particular mode of operation between the two DTEs may be selected. V.8 bis was motivated by other considerations also impacting its implementation including those directed to a telephone type device which shares a line with the DCE and with automatic answering stations.

V.8 bis negotiations are typically handled on a DTE-DTE basis. This means that legacy applications, generally can't take advantage of V.8 bis functionality unless that functionality was incorporated within their code.

The capabilities list (CL), capabilities list request (CLR) and mode select (MS) functionality contained within V.8 bis do not permit a DTE to change the existing configuration of its DCE (modem) to a different configuration, even if the modem supports other configurations. As new standards and new functionality evolve through the standardization process, taking advantage of these capabilities has heretofore required the need to rewrite the applications in the light of the new functionality provided.

Revision 9 of the draft recommendation V.8 bis dated Mar. 27, 1996 defines signals, messages and procedures for exchanging these over the general switched telephone network (GSTN) and on least point-to-point telephone-type circuits, when the modes of operation of the DCEs and DTEs communicating over the connection need to be automatically established and selected, but before signals are exchanged which are specific to a particular recommendation.

The principal characteristics of the Recommendation are as follows:

a) use over the GSTN or on leased telephone-type circuits, b) use at call establishment on the GSTN upon automatic answering, c) use after GSTN call establishment when the circuit is in telephony mode, d) provisions to exchange capabilities information for identifying common modes of operation between DCEs and between DTEs, e) provisions for a DCE to request the remote DCE to initiate a common mode of operation:

mode determination by the calling station upon automatic answering at GSTN call establishment, mode determination by the answering station upon automatic answering at GSTN call establishment, and mode determination after circuit establishment by either station.

f) provisions to prevent inadvertent disconnection of calls or annoying disturbance to users who may not have V.8 bis capability or be aware of V.8 bis procedures.

The environment in which V.8 bis operates is shown in FIG. 1. Data terminal equipment (DTE) 100 is typically a terminal used for the sending of information. Previously, it included relatively dumb terminals such as a VT 100 which lacks substantial processing power. Presently, many DTEs have substantial processing power and are frequently personal computer type devices. Clearly DTEs can go beyond the personal computer to the very highest level of commercial computers. A DTE connects to a DCE (110), which is typically a modem for communications purposes. DCE 110 connects to a corresponding DCE 110' over a telephone grade line 120. DCE 110' and DTE 100' are corresponding devices at the other end of the telephone grade line 120. DTE to DTE communications occurs over the modems 110 and 110' in a manner well-known in the art.

The V.8 bis provides for signals and messages for full duplex communications between devices. Signals are composed of a dual tone first segment and a single tone second segment.

Figure 2:
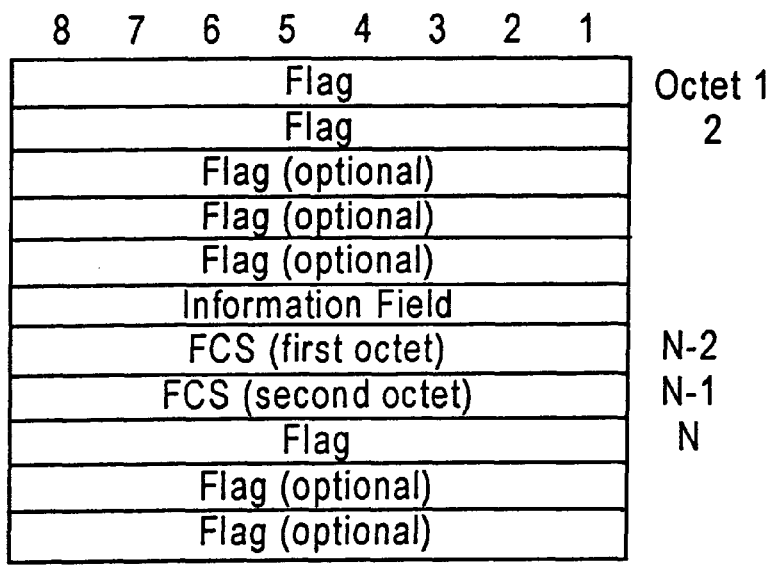
FIG. 2 is an illustration of a message structure used in V.8 bis.

As shown in FIG. 2, messages begin with 2–5 HDLC flag sequences, followed by an information field followed by a frame check sequence (FCS) and ending with 1–3 HDLC flags.

Figure 3:
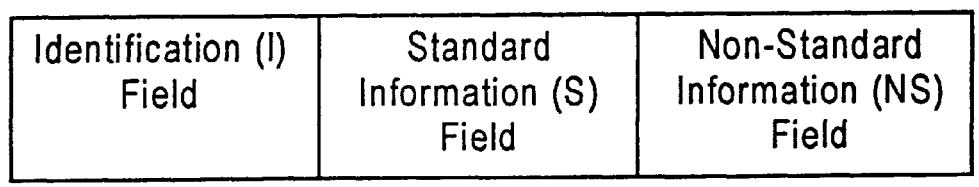
FIG. 3 is an illustration of a structure of the information field shown in FIG. 2.

FIG. 3 is an illustration of the structure of the information field shown in FIG. 2. The information field consists of three components: (a) first, in an identification field (I-field) followed by (b) standard information field (S-field), and (c) an optional non-standard information field (NS-field). The NS-field shown in FIG. 3 is not used with the invention and, accordingly, will not be further addressed.

In both the I and S fields most of the information to be conveyed consists of parameters relating to particular modes, features or capabilities associated with the two stations.

In order to a) encode these parameters in accordance with a consistent set of rules, and b) allow future extension to the parameter list in a way that permits present and future V.8 bis implementations to correctly parse the information field, the parameters are linked together in an extensible tree structure. The order in which the parameters in the tree are transmitted and the use of delimiting bits which enable the tree to be reconstructed at the receiver are described below.

Parameters (Pars) are classified as:

NPars—Parameters which have no sub-parameters associated with them, and

SPars—Parameters which have sub-parameters associated with them.

Figure 4:
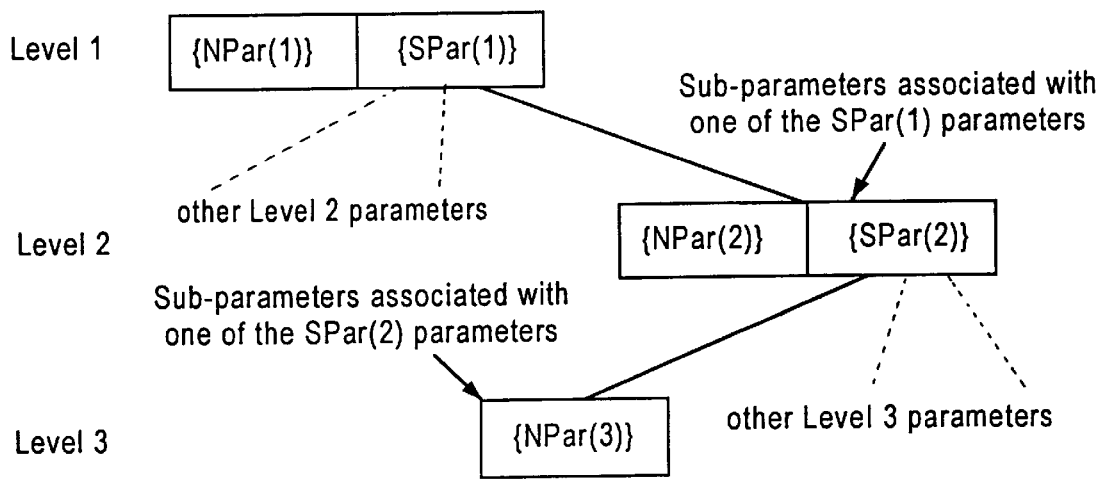
FIG. 4 is an illustration of an hierarchical arrangement of information used with the I-field and the S-field portions of the information field shown in FIG. 3.

FIG. 4 is an illustration of an hierarchical arrangement of information used with the I-field and the S-field portions of the information field shown in FIG. 3.

The general structure of this tree is as shown in FIG. 4. At level 1, the highest level of the tree, each SPar has associated with it, a series of Pars (NPars and possibly SPars) at level 2 in the tree. Similarly, at level 2 in the tree, each SPar has associated with it a series of NPars at level 3 in the tree.

As shown in FIG. 4, each bit of an SPar(1) field which is implemented points to an NPar/SPar pair at level 2. SPar(2) bits implemented point to NPar(3) level parameters although there is nothing which would prevent one from defining multiple levels beyond level 3, as shown more hereinafter, at the current revision of the recommendation, no levels are defined below level 3.

Figure 5:
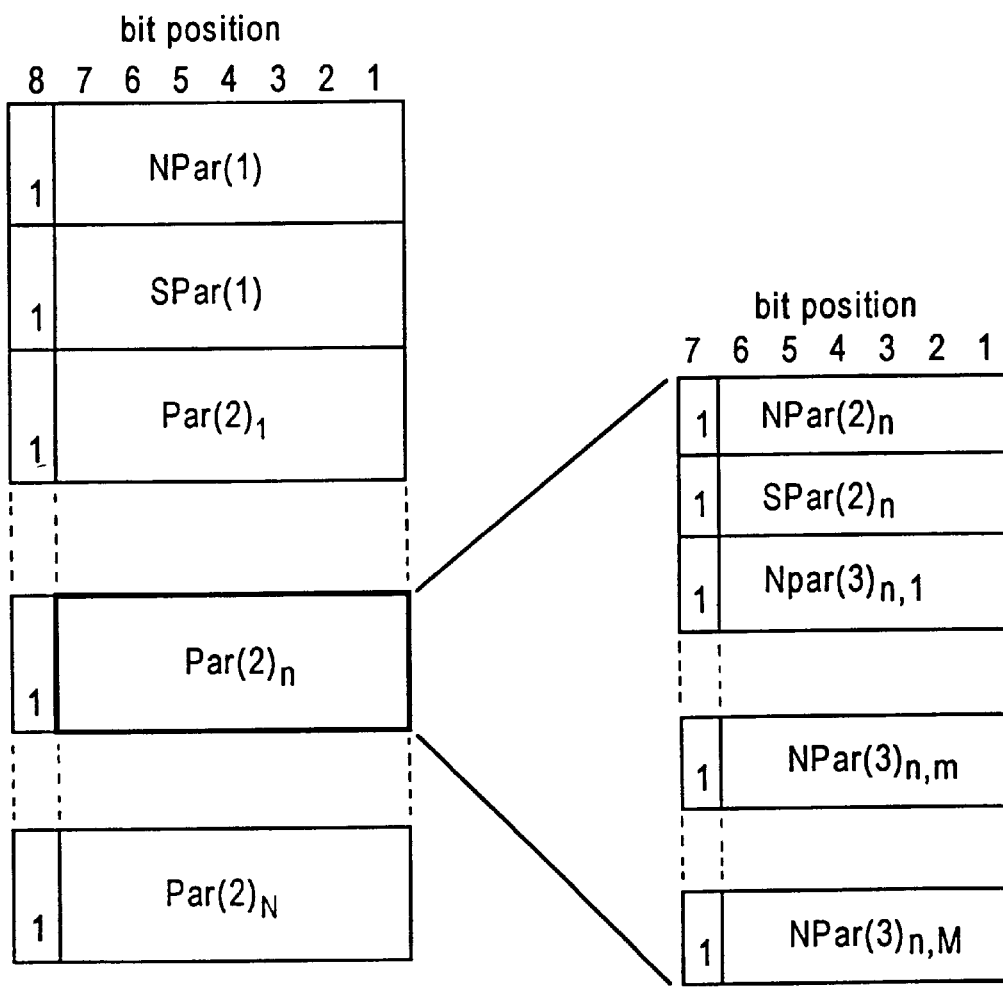
FIG. 5 is an illustration of how information is ordered for transmission in the I-field and S-field.
Figure 21:
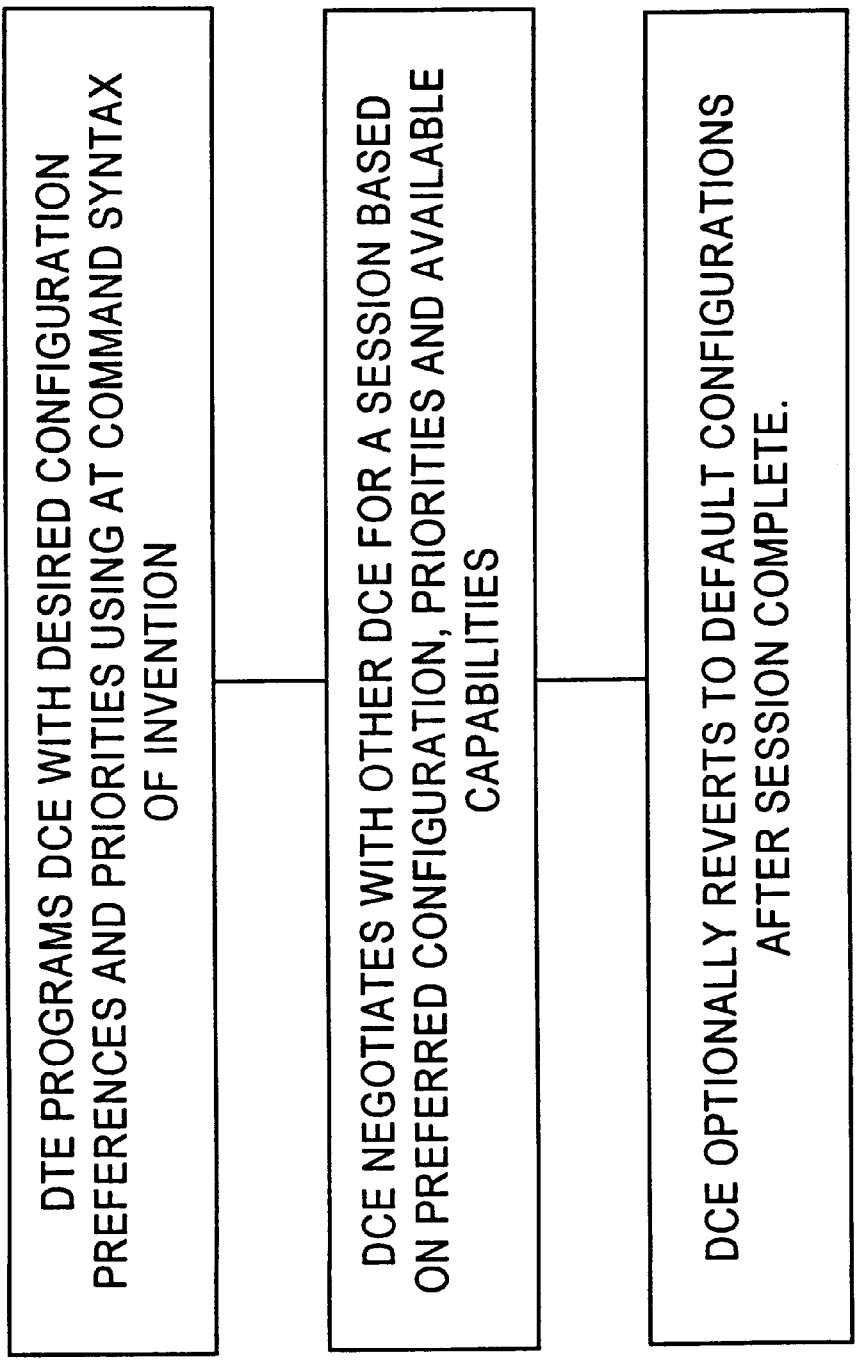
FIG. 21 is a flow chart of one use of the extended syntax in accordance with the invention.

FIG. 5 is an illustration of how information is ordered for transmission in the I-field and S-field. Parameters are binary encoded and transmitted serially. Parameters of the same type (i.e., level, classification and association) are transmitted sequentially as a block of data consisting of an integral number of octets.

The order of transmission of NPars and SPars is specified in FIG. 5.

$\{Par(2)_n\}$ indicates a set of level 2 parameters associated with the n'th level 1 SPar, and consists of NPar(2)n parameters and possibly SPar(2)$_n$ parameters.

$\{NPar(2)_{n,m}\}$ indicates a set of level 3 NPars associated with the m'th level 2 SPar which in turn is associated with the n'th level 1 SPar.

Transmission of parameters begins with the first octet of NPar(1) and ends with the last octet of Par(2)$_n$.

FIG. 6 shows the structure of the identification field (I-field) of the information field shown in FIG. 3.

The identification field consists of three components: (a) a 4 bit message type field, followed by (b) a 4 bit revision number field and (c) a bit-encoded parameter field.

FIG. 7 shows the semantics of the message type field of the I-field shown in FIG. 6. The purpose of the message type field is to identify the message type of the frame. The field is 4 bits in length and occupies the first 4 bits of the first octet in the identification field. The encoding shown in FIG. 7 applies. Different types of acknowledged (ACK and NACK) messages are defined more specifically in recommendation V.8 bis. The MS message is a mode select message, the CL message is a capabilities list message and the CLR is a capabilities list request message. These are utilized in V.8 bis to request and obtain information about the capabilities of the station at the other end and to select (MS) one of the modes available for communications.

FIG. 8 shows the structure of the revision number field of the I-field shown in FIG. 6. The 4 bits of the revision number constitute merely a binary number representing the revision level of the recommendation. This is important because modems implementing different revision levels may have operational nuances which need to be accounted for when communicating.

FIGS. 9A, 9B and 9C show the semantics of the bit positions of the NPar(1), SPar(1) and NPar(2) portions of the identification field, respectively. Remembering that an NPar has no subparameters associated with it, one can see that bits 1, 2, 3, 4 and 7 are implemented whereas 5 and 6 are reserved for future allocation. A binary 1 in any of the implemented bit positions indicates that the corresponding capability listed in the left-hand column is available.

In FIG. 9B, only one bit is implemented, namely bit 1. This bit 1 is utilized to specify a network type. An SPar does have subparameters. Accordingly, bit 1 of SPar(1) (the network type bit) refers to NPar(2) shown in FIG. 9C for specification of network types implemented. In FIG. 9C, three bits are shown as implemented, namely bits 1, 2 and 6.

The programming just discussed related to the identification field (I-field) programming. The I-field is shown in FIG. 3. A similar NPar/SPar hierarchy applies to a standard information field (S-field) of FIG. 3 as well.

FIGS. 10A and 10B show the semantics of the bit positions of NPar(1) and SPar(1) portions of the standard identification field shown in FIG. 3. The NPar(1) coding of FIG. 10A implements only a single bit, namely bit 7. However, the SPar(1) coding implements bits 1–7. Since an SPar has subparameters, one will expect that each implemented bit will have a corresponding NPar/SPar pair further refining its capabilities. For example, the SPar(1) bit 1 of FIG. 10B refers to data. FIGS. 11A, 11B and 11C show the semantics of the bits of the first, second and third octets of the Data-NPar(2) portions of the standard information field. Note that no SPar(2) bits have been defined, indicating that no lower level subparameters exists. Thus, the parameter definitions of the data mode specified in bit 1 of FIG. 10B are all shown in FIGS. 11A, 11B and 11C. Note that in accordance with the invention, the bits of the three octets shown in FIGS. 11A, 11B and 11C are numbered consecutively from 1–24. This numbering is used in accordance with the invention as discussed more hereinafter. All of the figures from 11A through FIG. 16 reflect the level 2 and below encoding of the services defined in FIG. 10B. FIGS. 11A, 11B and 11C have already been discussed.

FIGS. 12A, 12B and 12C show the semantics of the bits of the first, second and third octet of the simultaneous voice and data NPar(2) portions of the standard information field corresponding to bit 2 of the SPar coding shown in FIG. 10B.

FIGS. 13A, 13B and 13C show the semantics of the bits of the H.324 multimedia terminal NPar(2), SPar(2) and NPar(3) portions of the standard information field corresponding to bit 3 of the SPar(1) coding in FIG. 10B.

FIGS. 14, 15 and 16 show the semantics of the bits of the NPar(2) portions of the standard information field corresponding respectively to bits 4(V.18 text telephone), 6 (analog-telephony) and 7 (T.101 videotex terminal) of SPar (1) coding shown in FIG. 10B.

These level 2 and below implementations are shown for convenience in discussing the extensions to V.8 bis in accordance with the invention. It is important to understand the hierarchal nature of the information arrangement utilized in V.8 bis, as described above, in order to understand the syntax and the semantics of the extensions to V.8 bis provided in accordance with the invention. The use of each of FIGS. 2–16 is described more in detail in Revision 9 of Recommendation V.8 bis and are replicated here only for use in explaining the invention. The standard information field programming described in FIGS. 2–16 is mainly applied to the mode select (MS), capabilities list (CL) and capabilities list request (CLR) messages. In accordance with the invention, the NPar/SPar hierarchy defined in accordance with V.8 bis is utilized and extended to provide the capabilities now to be described.

In the prior art, DTE applications controlled the DCE with AT commands in accordance with V.25 ter annex A. This created somewhat of a problem because the application needed to be rewritten if capabilities changed. However, all modem applications such as those running on a DTE are capable of sending an initialization string to a modem. This is needed to cope with the diversity of modem implementations.

The invention extends V.25 ter annex A to provide a technique by which a DTE can exert direct control over a conveyed capabilities. The invention also permits DCE-DCE link negotiation including a prioritized list of preferred connection types. For example, a DCE is capable of establishing a V.34 through V.22 type of connection, as well as V.42 and V.42 bis error correction and compression. The DCE may be configured to prefer a V.34, V.42 bis connection, but optionally will accept a V.22 bis-V.42 link. To illustrate the technique presented herein, a plausible situation is presented in which two DCE stations, each with differing and common capabilities are configured and a connection is established. Throughout this description, references are made to various tables within the ITU V.8 bis specification. The DCE stations capabilities are as follows:

Station A: Is capable of setting up a Data (bit 1) a V.70 DSVD (bit 2) or an H.324 Multimedia (bit 3) type of connection. The Data capabilities are such that the DCE is able to establish a regular V.34-V.22 bis physical connection, using V.42/bis error control (see FIGS. 11A, 11B and 11C). The H.324 capabilities support Video, Audio and Data capabilities, which in turn provides logical control through V.42 or PPP (see FIGS. 13A, 13B and 13C). The V.70 DSVD capabilities are unimportant in this example. The local station's operator has determined that a Data connection of V.34 through V.32-V.42 bis is preferable, but will accept a V.42 type of connection using V.42 type of connection using V.34 or V.32 bis modulation rates as well.

Station B: Is capable of setting up a Data (bit 1) only type of connection. The Data capabilities are such that the DCE is able to establish a regular V.32 bis-V.21 physical connection, using V.42 only error control or Transparent data (see FIGS. 11A, 11B and 11C). The local station's operator has determined that a Data connection of V.32 bis along with V.42 is preferable, but will accept a V.32 bis transparent (buffered) type of connection as well.

Using the presented example of Station A's capabilities list, the Standard Information (S) Field transmitted from Station A would consist of: NPar(1)+SPar(1)+Data NPar (2)+H.324 NPar(2)+H.324 SPar(2)+H.324 Data NPar(3)+ V.18 NPar(2)

The remainder of this description discusses techniques of configuring the DCE for the preferred connection type(s), using AT commands in accordance with the invention. The AT commands provide a means of reviewing the DCE station's current settings. A masking scheme is also included allowing the operator to easily enable/disable a DCE capability. For example, while Station A is pre-configured, per the example presented earlier, the operator may wish to disable the V.18 capability. It would become laborious to have to reconfigure the entire DCE station, when all that is required is to disable V.18 in the Standard Information Field by setting it equal to 0. (see FIG. 10B—bit 4).

Although the tree structure is common to the I-field and S-fields of the information field, a means of differentiating between those fields is suggested, allowing for unambiguous segment programming. This will become apparent in the discussion which follows.

A V.8 bis Information Field consists of three main body segments. (see FIG. 3), namely the 1. Identification (I) Field,
2. Standard Information (S) Field, and
3. Non-Standard Information (NS) Field—optional.

While the tree structure is common for the first two body segments (I & S fields), a way of differentiating between those fields is defined, allowing for unambiguous segment programming. The NS field is vendor specific. Only the I & S field programming will be addressed herein; however, implementers wishing to adopt those encoding rules, may extend the proposed command structure to cover NS field programming.

Negotiations

The DCE controlled V.8 bis negotiation syntax is intended to leverage the DCE stations current configurations as set by normal AT commands. That is, if through the modem specific AT commands, a DCE is configured for normal +FCLASS=0 using V.42/bis and accepts any data modulation mode(V.34-V.21), then by default, these are the parameters that will be negotiated via V.8 bis.

Using the syntax presented herein, it is possible to override the DCE station current configuration, and negotiate a completely different type of connection, such as V.70 DSVD—assuming that the DTE/DCE combination support the capabilities.

When requested, V.8 bis provides a local stations capabilities to the remote modem. These capabilities convey the combined functions of the DTE/DCE stations, with no delineation between them. On the local end, a DTE station may contain an entire protocol stack such as H.324, requiring minimal support from the DCE (ie: V.80 SAM using normal +FCLASS=0 data mode). Alternatively, a DCE might support the entire H.324 protocol stack (+FCLASS= 18.0), requiring minimal control from the DTE. A third alternative would be an implementation where the requirements are shared between the DTE and DCE. In any case, a means is needed of informing the DCE which +FCLASS mode the DTE requires following the V.8 bis negotiation. If the DCE is configured to negotiate one of many possibilities, then for each it should be possible to specify the +FCLASS mode. If no +FCLASS mode is provided, then the current mode is the default. Since the usage of V.8 bis is expanding, providing the +FCLASS mode at any level within the V.8 bis architectural tree, allows for the proposed syntax to remain unaffected. For example, the usage of V.8 bis to negotiate FAX modes. At the uppermost level, Table 6.2/V.8 bis, an entry indicating FAX capabilities could be added, however at the next level, which +FCLASS 1, 2 or 2.0 option may need to be specified.

Potentially following V.8 bis negotiation, an implicit switch from one +FCLASS mode to another may be required, switching back to the original mode upon call termination.

While specifying the +FCLASS mode allows for each negotiable connection to have an associated DCE mode of operation, mode overlapping occurs when two or more connection types compete for the same mode but with differing operational boundaries. An example of mode overlapping exists within the industry today with PC based H.324 Videophone applications requiring DCE V.80 Synchronous Access Mode (SAM) support. Many of the modem manufacturers added V.80 support not as an independent +FCLASS mode, but as an extension to normal +FCLASS=0 support. This also required extensions to AT commands such as Error Control Selection (+ES), however there is no fallback capability to standard data operation when originating. The complexity of switching between standard +FCLASS=0 data operation and V.80 SAM operation, can be alleviated by having the DCE store pre-configured profiles in its Non-Volatile Memory (NVM). Mode selection is then performed through the more common AT&Fn command.

In order for standard +FCLASS=0 data operations, such as V.42/bis to be selected over +FCLASS=0 V.80 SAM operations, separate independent operational parameters are required for each potential connection type.

DCE V.8 bis Profiles

Leveraging off of the industry practice of profiles being stored in NVM, a concept of a virtual profiles is adopted herein. The virtual profile allows the DCE to maintain separate copies of the DCE operational characteristics, which are used during all phases of connections including establishing and maintaining the network, physical and logical connection. Associated with each connection preference, there is to be a virtual profile which is loaded into the DCE working profile following V.8 bis negotiations. Additionally the virtual profiles themselves may be saved in the DCE's NVM, effectively associating a virtual profile with NVM saved profile.

An AT command is required to select the active profile, with the following command and defaults are suggested:

Parameter
    +A8IP=vprof
Description

Selects a virtual profile containing the operational parameters used to govern a DCE throughout a connection. Once a virtual profile is selected, existing AT commands to query (i.e.: AT+ES?) the current DCE settings are to apply.

Defined Values

| vprof | Description |
| --- | --- |
| 1 | Standard Data |
| 2 | V.70 SVD |
| 3 | H.324 Multimedia |
| 4 | V.18 Text Telephone |
| 5 | FAX |
| 6 | Analogue Telephony |
| 7 | T.101 Videotex |

Read Syntax
    +A8IP?

The DCE shall transmit a string consisting of the command identifier and the current active virtual profile number as follows.
    +A8IP: <active vprof>
    e.g.: +A8IP: 1

COMMAND SYNTAX

The basic structure of the AT command syntax, evolves around the level "n" technique as described in FIG. 4, with the top most level referred to as level$_0$. Within each level$_n$ there are two possible subsections, referred to as NPar and SPar. The SPar subsection is optional; however, when supplied, each bit defined therein indicates that another level$_{n+1}$ must be provided. The next level in turn also consists of the two possible subsections (NPar and SPar).

SPar values are used to indicate that there are subsequent details pertaining to a specific level of the tree. For example, referring to FIG. 10B, each defined bit in the SPar(1) octet, indicates that there are to be subsequent details with respect to the bit specified. Bit 3 in FIG. 10B indicates that FIGS. 13A, 13B and 13C are to be provided. Following FIG. 13B, bit 1 of SPar(2) indicates that the NPar(3) (FIG. 13C) details be provided.

The proposed AT command syntax stipulates the segment level$_n$, and contains field definitions for the NPar/SPar details; and, as with standard AT command strings, spaces are ignored. The command details can be broken down into two main categories: a prioritized list of acceptable NPar connection types and a bit mask of subsequent features support—SPars. For example, referring to FIG. 10B, specifying bits 1 and 3 indicates that the local station is capable of providing Data or H.324 Multimedia. As discussed in the sections above, an operating profile may also be supplied.

The proposed command syntax uses bit positions within octets literally, and in situations where multiple octets are utilized, the number of the bits positions is extended linearly across octet boundaries. For example, referring to FIGS. 11A, 11B and 11C, bits 1–8 in octet #2 are referred to as bits 9–16 and similarly bis 1–8 in octet #3 are referred to as bits 17–24. In defining a connection preference of Transparent, T.434 and V.22 bis, an operator would select bits #1, #10 and #18, respectively.

Confusion of specifying bit #18 arises in differentiating bit #1 and bit #8 from bit #18. A means of delimiting the bits is required. Additionally, range selection is desirable for ease of configuration programming and reduced command line lengths. The six (6) syntax extensions shown in FIG. 17 are suggested as follows:

1. "–" operator for specifying range selections.
2. "," operator for performing AND operations of definitions.
3. "+" operator for performing OR operations of definitions.
4. "<" operator separates the priority assignment from the remaining field information.
5. ">" operator separates the profile from the remaining field information.
6. Separation of levels is achieved with a ".".

To select bits #1, #8 and #18, the syntax becomes 1,8,18 and my be entered in any order. To select bit #1 and bits #8 through #18, the syntax becomes 1,8-18. The ability to program multiple configurations, is provided by using the "+" separator, and requires that the whole list be enclosed in double-quotes ("). Thus to select both of the previous configurations, the syntax becomes "1,8,18+1,8-18". The entire connection list may be removed by providing an empty set via '""' or "0" syntax. The priority of the connection specified is optional and is intended to cope with extended AT command line lengths. If the priority is not specified, priority is assigned based upon positions in the list. Subsequent command entries may be entered which replace or append list definitions.

Connection preferences are described in a must have and options style of notation. For example, referring to Table 6.3/V.8 bis, if an operator wishes to have a connection of V.42/bis with any of the modulation rates (V.34-V.21), the syntax becomes "2,3, '13-20'". There are two (2) significant syntactical references in the previous example:

1. the nesting separator using the single-quote syntax ("'")
2. control bits in NPar/SPar fields (bit 7 and/or bit 8) are ignored.

In the above example, the 2,3 indicates the must have section, while the '13-20' portion refers to the options that the link is to support. Priorities within list are defined by their order entry, or from left to right.

To illustrate how the connection preferences are specified, referring to those outlined in the Station B preference list, specifying a sequence of "0<0>2,4+1<0>1,14". The priority ('0<' and '1<') and virtual profile ('0>') specifiers are optional, meaning that the sequence of "2,14+1,14" is the same. Additionally, a separate command sequence could have been used, specifying the exact priority of the preference, replacing any existing preference.

The connection list programming is not intended to be validated by the DCE station, since conditions may arise where a DCE station is requested to negotiate a connection by which it doesn't directly support. For example, a DCE station may not support a H.324 stack (+FCLASS=18.0), but the DTE does not and may request the DCE to carry out V.8 bis negotiations on its behalf. Not validating the configuration list is intended to achieve the same level of V.8 bis code point anonymity that DTE controlled V.8 bis negotiations enjoy, as referred to in the ITU V.25 terA specification.

The level at which an NPar preference list is to be programmed follows the bits position of the upper level's SPar field, with the top most SPar field being implied at level '0'. For example, when entering NPar(2) preference information compliant with Table 6.4/V.8 bis, bit #2 of Table 6.2/V.8 bis is referenced. Further, when programming NPar (3) preference information for Table 6.5/V.8 bis, both bit #1 of the SPar(2) field in Table 6.4/V.8 bis and bit #3 of Table 6.2/V.8 bis are to be referenced. Separation of the levels is achieved via a '.' separator. This syntax extension is intended to allow the command syntax to extend as required, providing an 'a.b.c . . . ' style of syntax.

Below is a summary list of programming rules supporting DCE controlled V.8 bis negotiations:

1. Specifying an SPar(2) {or n} list of '0' indicates that all previously linked level 3 {or n+1} capability programming has been disabled for participating in negotiations.

2. Providing an empty NPar preference list indicates that the upper level capability indication be disabled for participation in negotiations.

3. Providing an NPar preference list at level$_n$ for an upper level capability (SPar$_{n-1}$ bit), implies that the capability is enabled at the next available priority.

4. Maximum number of configurations [Pri:] is 10, numbered 0–9 and it not returned during DCE read and test reported values.

5. Maximum number of virtual profiles [PRO:] is 10, numbered 0–9.

6. The level 'n' at which the command is intended (i.e.: +A8ID/SIn), follows the parent SPar bit. Following standard V.25 ter syntax, a value of zero (0) is optional when specifying the command line, thus +A8SI is equivalent to +A8SI0. It is not returned during DCE read and test reported values, thus +A8SI? and +A8SI=? must return +A8SI: <configuration>. This intended to provide applications with a consistent parsing interface.

To summarize, the AT command syntax is as shown in FIG. 18.

COMMAND STRUCTURE—+A8ID IDENTIFICATION FIELD PROGRAMMING

Parameter

+A8ID[a[.b[.c . . . ]]]=[rev], "[Pri<] [Pro>] Preferred connection$_1$[+[Pri<] [Pro>] Preferred connection$_2$ . . . ]", "[Pri<] Priority$_1$[+[Pri<] Priority$_2$ . . . ]"

Description

Allows for DTE programming the Revision Number and Bit-Encoded Parameter fields of the Identification (I) Field segment. The 'rev' field may be entered for any level, with the last entered value being the revision conveyed to the remote DCE station. The bit specified in the connection preference(s) are referenced as literal bit positions, as described in section 4.2.1. Command Syntax and map directly into the NPar field of Tables 5.1 and 5.3/V.8 bis. The Priority value(s) are also bit and map the SPar field of Table 5.2/V.8 bis.

Defined Values

'rev' values may range from 1–15

Values are to adhere to Tables 5.1–5.3/V.8 bis.

Read Syntax

+A8ID[a[.b[.c . . . ]]]?

The returned Preferred Connection list is defined as bit positions as discussed in section 4.3. Command Syntax. The Pri and Pro separators have no meaning when referring to the Identification field programming of V.8 bis, and as such are not returned.

+A8ID[a[.b[.c . . . ]]]: rev, "Pref$_1$[+. . . [+Pref$_n$]]", "Priority$_1$[+. . . [+Priority$_n$]]"

Test Syntax

+A8ID[a[.b[.c . . . ]]]=?

The DCE shall transmit the valid range of the 'rev' field and NPAR/SPAR values indicating the current programming of the DCE station. Pri and Pro separators have no meaning when referring to the Identification field programming of V.8 bis, and as such are not returned.

+A8ID[a[.b[.c . . . ]]]: (1–15), "Pref$_1$[+. . . [+Pref$_n$]]", "Priority$_1$[+. . . [+Priority$_1$]]"

Recommended Default Settings

'rev' default recommended value is 1.

'NPAR' and 'SPAR' recommended setting is based upon the DCE stations internal, enabled capabilities. For example, if the DCE is configured and supports normal (vs. short)V.8 and support Revision 1 of the V.8 bis specification, then the query would be:

+A8ID?→+A8ID: 1,"1"

Implementation

Mandatory

COMMAND STRUCTURE—+A8SI STANDARD INFORMATION FIELD PROGRAMMING

Parameter

+A8SI[a[.b[.c . . . ]]]="[Pri<] [Pro>] Preferred connection$_1$[+[Pri<] [Pro>] Preferred connection$_2$ . . . ]" "[Pri<] Priority$_1$[+[Pri<] Priority$_2$ . . . ]"

Description

Allows for DTE programming the Revision Number and Bit-Encoded Parameter fields of the Standard Information (S) Field segment. The bit specified in the Preferred Connection and Priority sections are referenced as literal bit positions, as described in section 4.2.1. Command Syntax and map directly into the NPar/SPar fields of Tables 6.1–6.8/V.8 bis.

Defined Values

Values are to adhere to Tables 6.1–6.8/V.8 bis.

Read Syntax

+A8SI[a[.b[.c . . . ]]]?

The returned NPAR/SPAR masks are defined as bit positions as discussed in section 4.3 Command Syntax. Only the Pro field is to be returned as the Priority list itself exports the priorities.

+A8SI[a[.b[.c . . . ]]]: "Pro>Pref$_1$[, . . . [, Pro>Pref$_n$]]", "Priority$_1$[, . . . [, Priority$_n$]]"

Test Syntax

+A8SI[a[.b[.c . . . ]]]=?

NPAR/SPAR values returned should indicate the current programming of the DCE station. Only the Pro field is to be returned as the Priority list itself exports the priorities.

+A8SI[a[.b[.c . . . ]]]:"Pro>Pref$_1$[, . . . [, Pro>Pref$_n$]], ""Priority$_1$[, . . . [, Priority$_n$]]"

Recommended Default Settings

'NPAR' and 'SPAR' recommended setting is based upon the DCE stations internal, enabled capabilities. For example, if the DCE is configured for +FCLASS=0 and the supports V.42/bis along with V.34 through V.22 bis modulation modes, then the queries would be:

+A8SI?→+A8SI: "1"

+A8SI1?→+A8SI: "1>2,3,13–20"

Implementation

Mandatory

Example Negotiation Scenario

The following example is intended to illustrate the usage of the proposed AT command syntax in configuring a DCE station, followed by a complete connection negotiation.

Station A & Station B Prefer Data

| Station A DCE Configuration | | |
|---|---|---|
| DTE commands and data | DCE indications and data | Notes |
| AT&F+A8E= 1, 1, , 3 | OK | DCE controlled V.8bis & V.8 with +A8x V.8bis indications |
| AT+FCLASS? | 0<br>OK | DCE is configured for normal data operations |
| AT+A8ID=? | +A8ID: (1–15), "1–2"<br>OK | DCE is able to encode Revision 1–15 in all outgoing messages and is capable of V.8 and Short V.8 |
| AT+A8ID? | +A8ID: 1, "1–2"<br>OK | DCE is Revision 1 complaint and configured for either standard or short V.8 negotiation. |
| AT+A8ID=, "1" | OK | Disable short V.8 negotiation capability |
| AT+A8SI=? | +A8SI: "1–3"<br>OK | DCE is capable of making a connection supporting Data, DSVD and H.324. |
| AT+A8SI? | +A8SI: , "1"<br>OK | Enable DCE for Data only |
| AT+DS=3, 0 | | Enable V.42bis compression |
| AT+A8SI1? | +A8S1: "1>2, 3, 14"<br>OK | DCE is currently configured for V.42/bis using a modulation of V.32bis. There is no SPAR programming currently set. Following negotiations, the DCE is to load virtual profile 1. |
| AT+A8SI1= "1>2, 14" | OK | DCE has been reprogrammed to negotiate a connection of V.42 with modulation rates options of V.34-V.32 or must be V.42 with a modulation rate of V.34-V.324bis. |

Station B DCE Configuration

| DTE commands and data | DCE indications and data | Notes |
|---|---|---|
| AT&F+A8E= 1, 1, , 3 | OK | DCE controlled V.8bis & V.8 with +A8x V.8bis indications |
| AT+FCLASS? | 0 OK | DCE is configured for normal data operations |
| AT+A8ID=? | +A8ID: (1–15), "1" OK | DCE is able to encode Revision 1–15 in all outgoing messages and is capable of V.8 and Short V.8 |
| AT+A8ID? | +A8ID: 1, "1" OK | DCE is Revision 1 complaint and configured for standard V.8 negotiation. |
| AT+A8SI=? | +A8S1: , "1" OK | DCE is capable of making a connection supporting Data only. |
| AT+A8SI? | +A8S1: , "1" OK | DCE is currently enabled for Data. |
| AT+A8IP? | 1 OK | Current virtual profile is 1 (Data) |
| AT+DS? | +DS: 0, 0, 512, 6 | No compression enabled |
| AT+MS? | +MS: V32B, 1, 300,14400 | DCE is configured for modulations of V.32bis-V.21 with automoding enabled. |
| AT+A8SI1? | +A8S1: "1>2, '14–20'" OK | DCE is currently configured for V.42 only using modulations of V.32bis-V.21. There is no SPAR programming currently set. |
| AT+MS= V32B, 1, 12000, 14400 | OK | Configure DCE for modulations of V.32bis with automoding enabled. |
| AT+A8SI1? | +A8SI: "1>2, 14" OK | DCE is currently configured for V.42 only using modulations of V.32bis-V.21. There is no SPAR programming currently set. |
| AT+DS=3, 0 | OK | Enable V.42bis compression |
| AT+A8SI1? | +A8SI: "1>2,3, '14–20'" OK | DCE is currently configured for V.42/bis only using modulations of V.32bis-V.21. There is no SPAR programming currently set. |
| AT+A8IP=2 | OK | Activate a new virtual profile which is a copy of the current profile |
| AT+ES=1 | OK | Configure the DCE for Buffered mode |
| AT+A8SI1= "1>2, 314+2>1, 14" | OK | DCE has been reprogrammed to negotiate a connection of V.42/bis with a modulation rate of V.32bis or must be a Transparent connection using V.32bis. Following negotiations, the DCE is to load virtual profile 1 or 2. |

Station A Originates, Station B AutoAnswers

| Station A commands and data | Station A indications and data | Station B commands and data | Station B indications and data | Notes |
|---|---|---|---|---|
| ATDT12 | | | | |
| | | | RING | report detected |
| | | | | RING answer and send $MR_a$ |
| | +A8R: 1 OK | | | report MR and send $CR_d$ |
| | | | +A8R: 7 OK | report CL request and send CL |
| | +A8R: 0, 128180808107E0 OK | | | report CL supporting V.42/bis and Transparent data using V.32bis a modulation rate send MS |
| | | | +A8R: 0, 118180808102E0 OK | Report MS requesting a V.42data connection using V.32bis send ACK send ANSWER-TONE |
| | +MCR: V32B +MRR: 14400 +ER: LAPM +DR: NONE CONNECT | | +MCR: V32B +MRR: 14400 +ER: LAPM +DR: NONE CONNECT | indicate negotiation completed |

Another example might help illustrate the benefits of the invention. Assume a legacy application was written in 1984 and it was originally written for a V.21 modem (300 bps data). Assume further that the application was rewritten in 1988 to work with V.22 bis (2400 bps data). Since that time, a number of other capabilities have been defined including V.8 bis (discussed above), V.25 ter (serial asynchronous automatic dialing and control), V.32 (9600 bps), V.32 bis (14.4 kbps), V.32 (28.8 kbps), V.42 (error correction) and V.42 bis (data compression). None of those capabilities existed at the time the legacy application was written. Assume now that the user buys a new computer which has an internal modem which handles all of the standards mentioned before. Using the extensions to V.8 bis described herein, a user can utilize the initialization string provided by the legacy application to program the DCE with the user's preferred modes and the legacy application would communicate with the other DCE with its full capabilities set available to the user.

The invention expands the capabilities set of V.8 bis beyond being merely a requesting (CLR), reporting (CL) and selecting (MS) set of interactions to a command set of interactions by which the DCE can be configured by the DTEs in the initialization string (which is not hard coded into the legacy application,) to set a configuration or to override an existing configuration. In addition, one can change capabilities during a session and can set a list of preferences in a priority order. The invention permits legacy applications to take advantage of new functionality as new standards evolve.

There has thus been described a series of extension to V.8 bis which permit expanded functionality and greater flexibility when setting up and communicating using a modem. The invention described overcomes the problems of the prior art in a flexible and cost effective manner.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A modem, comprising
   a. a DCE input for receiving commands which pre-configure V.8 bis protocol negotiations by the modem and for receiving data from data terminal equipment;
   b. a communications line output; and
   c. a processing element configured to receive said commands from said data terminal equipment.

2. The modem of claim 1 in which said configuration commands pre-configure identification and standard message information fields in said modem in compliance with V.8 bis.

3. The modem of claim 1 in which said configuration commands include alternative configurations.

4. The modem of claim 3 in which the alternative configurations are prioritized.

5. The modem of claim 3 in which at least one of said alternative configurations includes an indication of at least one preference.

6. The modem of claim 1 in which said configuration commands from said data terminal equipment are received as part of an initialization string.

7. The modem of claim 1 in which said processing element is configured to perform V.8 bis negotiations with another modem based on said configuration commands.

8. A method of configuring communications equipment, comprising the steps of:
   a. sending an initialization string from a DTE to a DCE; and
   b. configuring said DCE in accordance with V.8 bis pre-configuration commands contained in said initialization string.

9. The method of claim 8 in which said commands specify alternative configurations.

10. The method of claim 9 in which the alternative configurations are prioritized.

11. The method of claim 9 in which at least one of said alternative configurations includes an indication of at least one preference.

12. A system for communications between stations, comprising;
   a. a network to which a plurality of stations are connected; and
   b. at least one station, connected to the network, including a DTE and a DCE arranged so that the DTE can configure the DCE so the DCE can conduct V.8 bis negotiations independently of the DTE with other stations connected to the network.

13. The system of claim 12 in which the DCE is configured to inform the DTE of what was negotiated.

14. A method of communicating between stations connected to a network, comprising the steps of:
   a. pre-configuring at least one DCE to conduct V.8 bis protocol negotiations over a network using commands from a local DTE, and
   b. causing said DCE to perform V.8 bis negotiations with another station over the network.

15. The method of claim 14 in which said commands specify alternative configurations.

16. The method of claim 15 in which at least one of said alternative configurations includes an indication of at least one of preference.

17. A computer program product, comprising:
   a. a memory medium; and
   b. a computer program stored on said memory medium, said computer program containing instructions for configuring data communications equipment to perform V.8 bis negotiations with a connected station based on commands received from a local data terminal equipment.

18. The computer program product of claim 17 in which the program is transmitted from the memory medium to a destination over a network interface.

19. A computer program product, comprising:
   a. a memory medium; and
   b. a computer program stored on said memory medium, said computer program containing instructions for sending an initialization string from a DTE to a DCE; and configuring said DCE for protocol negotiations in accordance with commands contained in said initialization string.

20. The computer program product of claim 19 in which the program is transmitted from the memory medium to a destination over a network interface.

21. A computer program product, comprising:
   a. a memory medium; and
   b. a computer program stored on said memory medium, said computer program containing instructions for configuring at least one DCE connected to a network using commands from a DTE, and causing said DCE to perform V.8 bis negotiations with another station connected to the network based on said commands.

22. The computer program product of claim 21 in which the program is transmitted from the memory medium to a destination over a network interface.

* * * * *